Aug. 15, 1939.   J. CRITES   2,169,680
WHIZZER SEPARATOR
Filed March 24, 1937   2 Sheets-Sheet 2

Inventor
Joe Crites
By Barnett & Truman
Attorneys

Patented Aug. 15, 1939

2,169,680

UNITED STATES PATENT OFFICE 2,169,680

WHIZZER SEPARATOR

Joe Crites, Evanston, Ill., assignor to Combustion Engineering Company, Inc., New York, N. Y., a corporation of Delaware Application March 24, 1937, Serial No. 132,784

20 Claims. (Cl. 209—144)

This invention relates to certain new and useful improvements in mechanical separators, and more particularly to improvements in that type of separator in which the finely divided material to be graded is projected, preferably by centrifugal force, into and across the path of a rising air current which picks up and carries away in suspension only the finer particles, whereas the heavier particles are rejected and gravitate out of the air stream into a collecting means.

This improved separator is of the general type disclosed and claimed in the patent to Walter M. Cook, 1,783,357, granted December 2, 1930. In this Cook separator a rotary deflecting member or "whizzer" is mounted on a central vertical axis within the separation chamber and above the distributor so as to cut across the rising air stream. This rotary deflector or whizzer comprises a multiplicity of substantially radial blades or vanes the central portions of which are connected by an apron or disk so that air passages remain only between the outer portions of the vanes. The outer ends of the vanes closely about a conical deflecting member that extends inwardly and upwardly from the enclosing casing so as to overlap the outer end portions of the vanes. The rotating vanes throw any heavier particles of the material that may tend to rise in the air stream outwardly against the inclined lower surface of the stationary deflecting member from which they carom downwardly at the sides of the chamber and join the heavier material that initially gravitates out when thrown from the distributor. The only material that can rise above these cooperating deflecting members is sufficiently fine to be carried in suspension in the rising air stream which finds its way between the rapidly rotating deflector vanes. Above the deflecting members and between them and the fan which actuates the rising air stream is an inwardly extending annular partition wall which compels the air laden with finely divided material to flow inwardly or counter to the outward throw imparted by centrifugal force to the material in the rotating air stream before it passes out and through the fan chamber. This permits a final sorting or separating action whereby any relatively heavy particles that may have passed up through the cooperating deflectors are thrown outwardly to a ledge above the fixed conical deflecting ring from which these particles fall back through the rotary deflector and are rejected along with the other tailings.

It has been found that a separator of this type is not as efficient as might be desired where the initial material to be separated is rather coarse, and the desired material is quite fine. For example, suppose a material having an initial fineness of 60% through a 300 mesh screen is to be increased to a fineness of 99.9% through a 300 mesh screen. In order to accomplish this in a single separator of the type hereinabove described it would be necessary to install an excessive number of whizzer blades, and an excessive amount of the fine material will be rejected along with the tailings. However, from an initial material having a fineness of 60% through a 300 mesh screen can be obtained a material that grades 90% through a 300 mesh screen without an excessive loss of fine material in the tailings. By a subsequent similar separating process the 90% material can be similarly reduced to a material that grades 99.9% through a 300 mesh screen. Instead of accomplishing this result in two distinct separators, operated in series, or by passing the material twice through the same separator, the present improved apparatus performs this double separation process in a single separator and in a single continuous operation. According to this invention, two separate whizzer assemblies are superposed one above the other in the same separator, an intermediate centrifugal sorting space being provided between the two whizzers. The first separation process is performed in the lower whizzer, and subsequent separation processes are carried out in the sorting space and in the upper whizzer. This improved apparatus not only has the more apparent advantages of economy in apparatus, space required for the installations, and time saved in performing the entire separation in one continuous process, but it has also been discovered that there is a distinct increase in the efficiency of the single separation process over the use of two or more distinct separation processes performed in different separators of this type or by passing the material more than once through the same apparatus. The reasons for this will be set forth more in detail in the description which follows.

The general object of this invention is to provide an improved separator of the type briefly described hereinabove and disclosed more in detail in the specifications which follow.

Another object is to provide a separator of this type comprising two superposed whizzer assemblies used in series within the same separating chamber.

Other objects and advantages of this invention will be more apparent from the following detailed description of one approved form of apparatus constructed and operating according to the principles of this invention.

The apparatus comprises in general an outer casing A, an inner casing B, a rotatable assembly comprising the distributing disk C and whizzer assemblies E and E′ positioned within the inner casing B, and the fan D positioned in the outer casing directly above the inner casing, the means F carried by the outer casing for rotatably suspending the rotary assembly, the means G for rotating this assembly, and the means H for feeding the material to be graded onto the distributing disk C.

Figure 1:
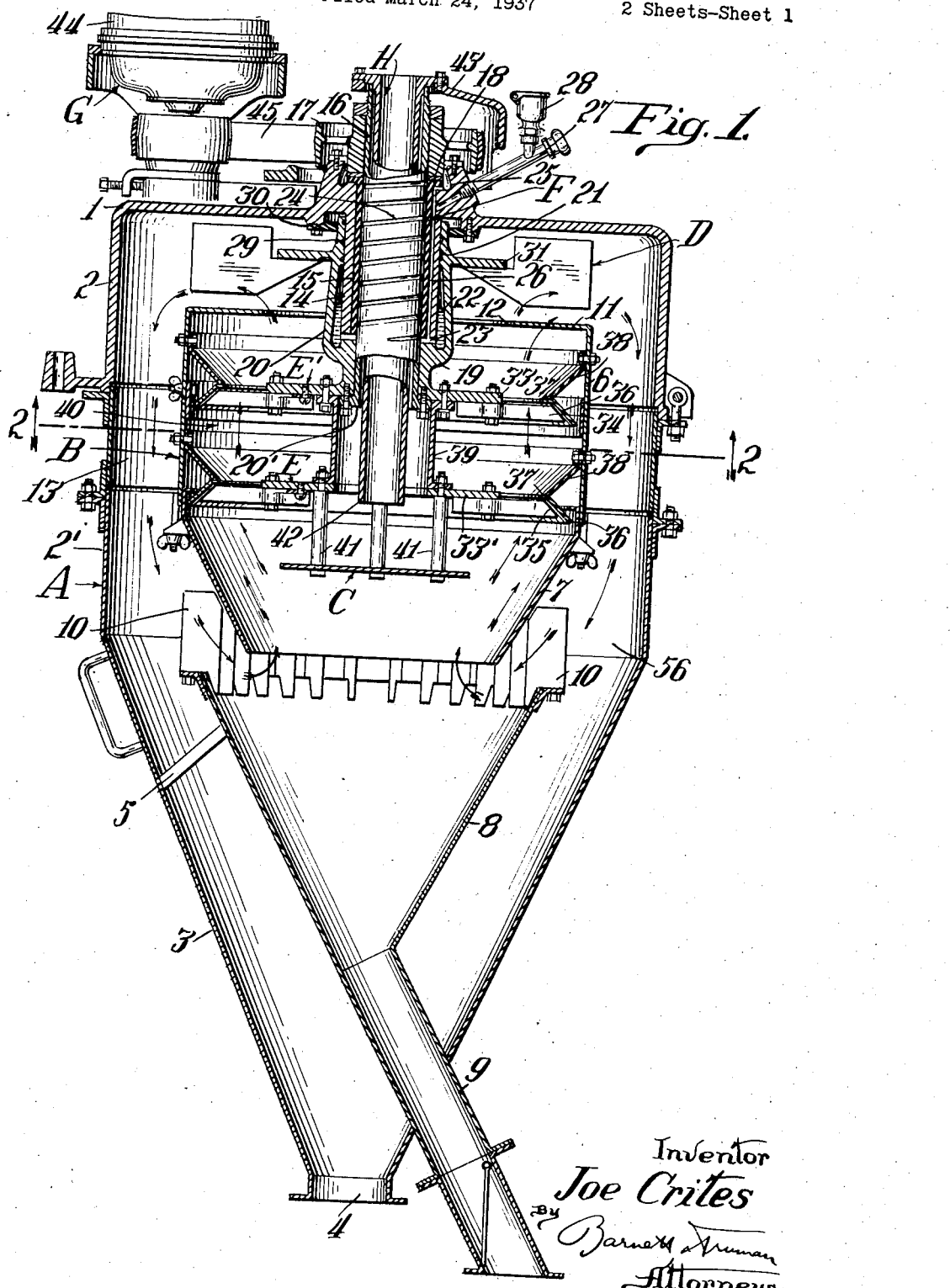
Fig. 1 is a central vertical section through the separator.

The outer casing or housing A, which is suitably supported in a vertical position by means not here shown, comprises the top or cover wall 1, an upper cylindrical shell portion indicated at 2 and 2′, and a lower conical shell 3 which converges downwardly to the discharge opening 4 through which the finely divided material separated out by this air separation process is delivered. The inner casing B is positioned symmetrically about the same central vertical axis as the outer casing but spaced inwardly from the outer casing, and is supported from the outer casing by a plurality of struts or braces, one of which is indicated for example at 5. This inner casing comprises an upper cylindrical shell 6, and a downwardly converging lower conical portion consisting of the two overlapping conical shells 7 and 8. A discharge spout 9 leads out through one side of the outer conical shell 3 so as to discharge the heavier particles or tailings collected by the inner conical shell 8. The inner conical shells 7 and 8 are connected and spaced apart by a plurality of vertically extending vanes or baffles 10, the spaces between these baffles permitting the air stream to return from the outer casing into the lower portion of the inner casing. The top of the inner casing B is partially closed by the inwardly extending annular horizontal partition or flange 11 so that the air stream can only flow out through the rather large central opening 12. The fan D (hereinafter described more in detail) causes an air circulation as indicated by the arrows in Fig. 1, the air stream being drawn upwardly through the inner casing B, out through the central opening 12, thence outwardly and downwardly through the outer shell A and through the annular passage 13 between the inner and outer shells, thence inwardly through the passages between the vertical vanes 10 and upwardly into the inner casing B.

The rotatable assembly comprising the distributing disk C, fan D, and whizzers E and E′ are supported as a unit so as to rotate about the central vertical axis of the separator by the means F supported by top wall 1 of the outer shell A. The supporting means F comprises a downwardly extending tubular bearing sleeve 14 formed integrally with or supported by the top wall 1 of casing A and supporting an inner tubular bushing 15. A tubular vertical shaft 16 is keyed at its upper end within and supported by a driving gear or pulley 17 which is in turn supported on a thrust bearing 18 at the upper end of bushing 15. An outer casting 19 is attached to and supported by the outwardly extending collar or flange 20′ at the lower end of hollow shaft 16. Casting 19 is provided with the upwardly and inwardly extending portion 20 which has a bearing at 21 on the upper outer surface of bearing sleeve 14. The annular space 22 between member 20 and bearing sleeve 14 forms an oil well which communicates through lower passages 23 with the outer surface of shaft 16. This shaft is provided with an outer spiral groove 24 which serves to lift oil from well 22 along the bearing surfaces between the shaft and bushing 15, this oil being discharged outwardly through thrust bearing 18 into the collecting groove 25. From groove or channel 25 the oil is again discharged downwardly through a vertical passage 26 in bushing 15 and thence back to the oil well. Additional oil may be supplied through conduit 27 provided with oil cup 28 and communicating with the vertical passage 26. A reversely pitched spiral groove 29 formed in bearing 21 tends to return oil that may work up from oil well 22, and a sealing means 30 carried by casing A also tends to prevent the escape of oil.

A disk or flange 31 projecting horizontally outward from casting member 20 serves to support the vanes or blades 32 of fan D.

Figure 2:
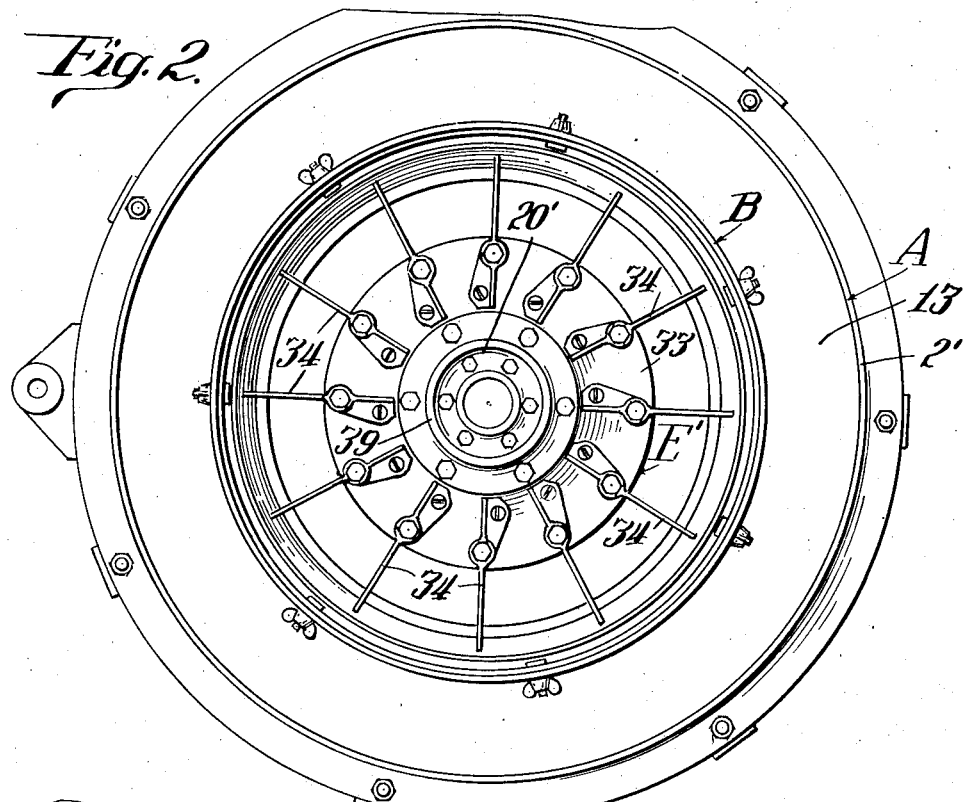
Fig. 2 is a horizontal section, on a somewhat larger scale, taken on the line 2—2 of Fig. 1 and looking upwardly in the direction of the arrows.

The upper whizzer E′ comprises a central disk or plate 33 which extends horizontally outward from the lower portion of rotary casting 19, and a plurality of rather thin and narrow blades or vanes 34 which project radially outward toward the cylindrical wall 6 of the inner shell and which are suitably secured at their inner ends to the lower surface of disk 33 as best shown in Fig. 2. The number of these vanes 34 that will be used depends upon several factors such as the speed of rotation of the rotatable assembly, the diameter of the whizzer assembly, and the degree of fineness desired in the separation process. The outer end portions of these vanes are preferably beveled upwardly and inwardly as indicated at 35. Cooperating with this rotary deflector or whizzer is an annular stationary deflector carried by the surrounding inner wall of shell 6. This stationary deflector comprises an upwardly and inwardly extending conical shell 36 and an inwardly extending horizontal ring or flange 37 which overlaps the outer end portions of the vanes 34. The beveled ends of vanes 34 are so inclined as to rotate in close proximity to the conical deflector wall 36. This stationary deflector is supported in any suitable manner from the adjacent wall of inner casing B, as here shown by means of a downwardly and inwardly extending annular conical member 38 attached at its upper edge to the adjacent casing wall. As will be hereinafter pointed out, this annular wall 38 could be omitted and the conical deflector supported by a horizontally extending plate or struts. It will be noted that upward air flow is cut off through the central portion of the casing by the disk or plate 33, and is cut off at the outer or peripheral portion of the casing by the stationary deflector so that the only passage left for the upward flow of air is between the rapidly rotating whizzer blades.

The lower whizzer E is supported in spaced relation below the upper whizzer E′ by the tubular sleeve member 39 attached at its upper end to disk 33 of the upper whizzer and at its lower end to the disk 33' of the lower whizzer. This lower whizzer E may be in all essential respects the same as the upper whizzer E', as is also the stationary deflector 36 cooperating therewith. The two whizzers E and E' are spaced apart a sufficient distance to provide a suitable unagitated sorting space 40 between the two whizzers as will be hereinafter described.

The distributing disk C is suspended below the lower whizzer E by means of suitable posts 41. The feeder H comprises a non-rotary tube 42 which extends freely downwardly through hollow shaft 16 and which is supported at its upper end by the housing 43 carried by outer casing A and partially enclosing the driving means. The rotary assembly may be driven in any suitable manner. In the example here shown the driving means G consists of a motor 44 suitably supported on outer casing A and connected by belt gearing 45 with drive pulley 17 at the upper end of shaft 16. If desired, suitable change-speed gearing may be interposed between motor 44 and shaft 16 so that the speed of rotation of the whizzers may be varied as desired. In general the fineness of separation will be increased by increasing the speed of the whizzers, and vice versa.

Figure 3:
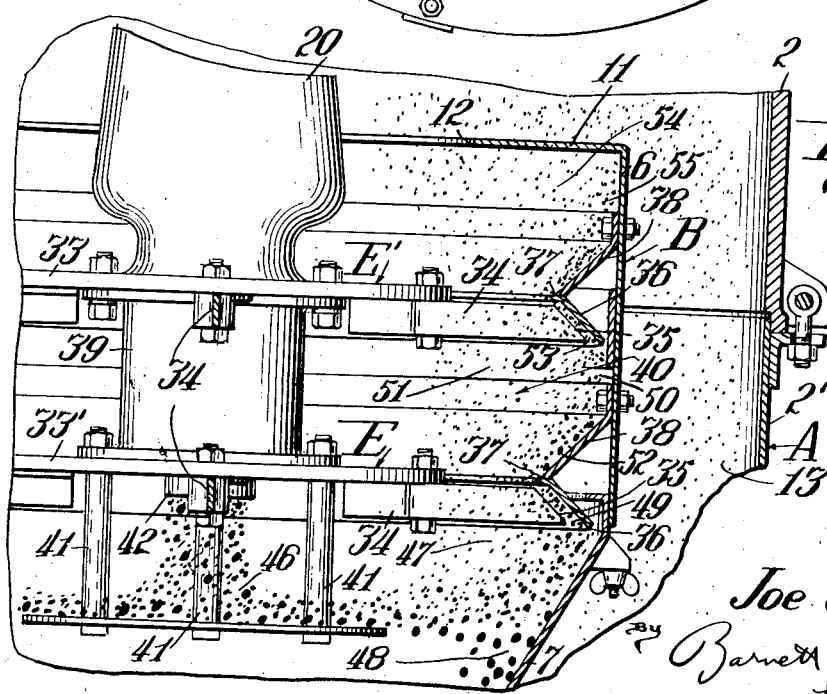
Fig. 3 is a fragmentary view, partially in vertical section and partially in elevation, showing on a larger scale a portion of the whizzer or separating assembly so as to better illustrate the operation thereof.

The operation of this separator can more easily be explained by reference to Fig. 3 which shows a portion of the apparatus on a larger scale and in which the path of the material particles through the apparatus has been illustrated. It will be understood that the sizes of the material particles have been greatly exaggerated in order to make this showing possible.

The rather coarsely graded material 46 introduced through feed conduit 42 falls onto the rapidly rotating distributor disk C and is thrown outwardly by centrifugal force through the rising air stream. Only the lighter and finer particles 47 are carried upwardly by the air stream created by fan D, the heaviest particles 48 falling downwardly through conical shell 7 or being thrown outwardly against the wall of the inner casing and thence gravitating downwardly. This initial separation process is not sufficient to satisfactorily reject or divide out all of the heavier particles of the material and secure the desired grade of fineness. The air stream carrying the mixed particles 47 which are not originally rejected in the first centrifugal operation flows upwardly between the rapidly rotating vanes or blades 34 of the whizzer. As soon as the heavier particles 49 in this rising air stream are caught by the revolving blades 34 they will be carried around by these blades and thrown outwardly by the centrifugal force against the conical surface 36 of the stationary deflector from which they are thrown downwardly to join the heavier particles 48 already rejected. The operation as thus far described is essentially the same as in the Cook separator already referred to in which only a single whizzer is used. The action of each of the two whizzers E and E' in the present improved construction is essentially the same except for the fact that the material which reaches the upper whizzer E' is finer or contains a smaller percentage of coarse material than that acted upon by the lower whizzer E. The material which succeeds in passing between the whizzer blades and is carried in suspension in the air stream passes into a sorting space above the whizzer wherein it continues to whirl rapidly within the inner casing but is unagitated, that is there are no beater members within this space to impact the material. A centrifugal sorting action takes place within this space, the heavier particles being collected near the outer wall of the casing whereas the smaller particles remain nearer the center of the apparatus. Considering first the materials which are carried in suspension into the sorting space 40 between the lower and upper whizzers, this centrifugal grading operation assembles the heavier particles 50 adjacent the outer wall of the casing, whereas the finer particles 51 are carried upwardly into the upper whizzer E'. The upward force of the air stream is diminished adjacent this outer wall due to the overhanging stationary deflector of the upper whizzer, and eddy currents are set up so that the heavier particles 50 settle downwardly onto the sloping shelf 38 as indicated at 52 and gradually dribble back through the lower whizzer by means of which they are thrown against the lower surface of the stationary deflector and are directed downwardly so as to gravitate out along with the other tailings. To this material 50 that collects adjacent the outer wall of the sorting space 40 is added the heavier particles rejected by the upper whizzer E' as indicated at 53. The suspended material which succeeds in passing the upper whizzer E' flows into the upper centrifugal sorting space 54 wherein the operation is substantially the same as in the Cook separator already referred to. The air stream drawn out by fan D must flow inwardly and upwardly through space 12 within the upper annular partition 11 so that the comparatively heavier particles will collect at 55 within the outer comparatively quiet portion of this sorting space, and these particles 55 will settle downwardly and pass back through whizzer E' in much the same manner as already described with relation to the lower whizzer. Only the finest particles are carried out by the air stream through the central upper opening 12 and thus outwardly and downwardly through annular passage 13 around the inner casing. The greater part of this fine material settles out of the air stream in the expanded portion 56 of this passage, the material gravitating downwardly through cone 3 and discharge outlet 4, whereas the air stream passes inwardly between baffles 10 and thence again upwardly through the inner shell.

It might here be noted that the sorting or grading action within the unagitated centrifugal space 40 between the two whizzers is much more effective than the similar action within the sorting space 54 above the upper whizzer E'. This is partially due to the fact that the material is more rapidly rotated within this space due to the action of the whizzers, one above and the other below this falling material. Also the material that is being driven downwardly by the upper whizzer E' assists in holding back the heavier material graded out in this sorting space 40 so that a greater percentage of this heavier material passes downwardly to and through the lower whizzer E.

The desirability of using the two separate whizzers E and E' and subjecting the material to this repeated separating operation (as briefly referred to earlier in this description) may now be more clearly explained. It will be understood that the initial material to be graded or separated contains a large proportion of sufficiently finely divided material and that a certain percentage of this fine material will inevitably be rejected along with the tailings in any separation process of this sort. It is desirable to hold this percentage down as much as possible. Assuming, as in the example already considered, that the original material to be graded will pass 60% through a 300 mesh screen and that it is desirable to increase the fineness to 99.9% through a 300 mesh screen, it might be possible to do this in a single separating operation in a single-whizzer separator, but it would be necessary to use an excessively large number of whizzer blades and rotate the whizzer at a very high speed, or both, and the percentage of fine material rejected along with the tailings would be so large that the separating operation would be inefficient. However, with this improved apparatus the lower whizzer E will be so proportioned that the material delivered into the central sorting zone 40 will grade about 90% through a 300 mesh screen, and in this case the percentage of fine material rejected by the first whizzer will be relatively small. This material from the intermediate zone 40 can then be passed through the second whizzer E' and the final material carried out by the air stream reduced to a fineness of 99.9% through a 300 mesh screen. Of course, this two-stage separation process could be performed by passing the materially successively through two different single-whizzer separators, or by passing the material through the same separator in two successive separation processes. It will be apparent that the present improved double-whizzer separator effects a considerable saving in installation cost and space and power required over the use of two different separators. There is also a great saving in time over passing the material twice through the same separator. Beyond these more obvious advantages, it has been discovered that the single double-whizzer separator herein disclosed is considerably more efficient than the two-stage process. The reasons for this are not completely understood as yet, but it is believed that the following causes are involved in this great increase in efficiency: The sorting or grading action in the intermediate zone 40 is much more effective than in the upper sorting zone 54. The centrifugal action in this intermediate zone is greater due to the whirling action imparted by the two whizzers, one above and the other below this sorting space. Also the downward rejection of material from the upper whizzer tends to oppose the upward flow of coarse material sorted to the outer portion of the zone 40, thus assisting the barrier formed by the upper stationary deflector in preventing the upward flow of coarse material. It will also be noted that if two individual separators are used in tandem (that is if the fines withdrawn from the first separator are then reintroduced through this separator or another separator), there will be a loss of fines with the tailings from each of the two separators. In the present double-whizzer separator the fines which are rejected along with the tailings from the upper whizzer must pass downwardly through the lower whizzer and the greater portion of these fines will be returned again to the upper whizzer and eventually carried out with the air stream. For these, and perhaps other reasons not apparent, it has been found that the total percentage of fines rejected along with the tailings is much less with this improved unit separator than when the process is performed in two successive separating apparatuses. Also the output of fine material per unit of time is much greater with this improved separator than when two single-whizzer separators of comparative size are used. Also there is a great saving in the power required for operating this double-whizzer separator, as compared with that required for operating two single-whizzer separators of comparative size and capacity.

I claim:

1. In a separator, means for causing an upward flow of air through the casing with material to be separated suspended in said air flow, and a pair of similar separating assemblies positioned in superposed relation within the casing so as to provide an unagitated centrifugal sorting space between the assemblies, each separating assembly comprising an outer stationary annular conical deflector carried by the casing wall and projecting inwardly and upwardly, and an inner rotary whizzer extending at its periphery into proximity to the conical wall of the stationary deflector.

2. In a separator, a casing, means for causing an upward flow of air through the casing with material to be separated suspended in said air flow, and a pair of similar separating assemblies positioned in superposed relation within the casing so as to provide an unagitated centrifugal sorting space between the assemblies, each separating assembly comprising an outer stationary annular conical deflector carried by the casing wall and projecting inwardly and upwardly, and an inner rotary whizzer comprising a central disk portion and a plurality of substantially radially projecting vanes the outer ends of which extend into proximity to the conical wall of the stationary deflector.

3. In a separator, a casing, means for causing an upward flow of air through the casing with material to be separated suspended in said air flow, and a pair of similar separating assemblies positioned in superposed relation within the casing so as to provide an unagitated centrifugal sorting space between the assemblies, each separating assembly comprising an outer stationary annular conical deflector carried by the casing wall and projecting inwardly and upwardly, and an inner rotary whizzer comprising a central disk portion and a plurality of substantially radially projecting vanes the outer ends of which are beveled upwardly and inwardly and extend into proximity to the conical wall of the stationary deflector.

4. In a separator, a casing, means for causing an upward flow of air through the casing with material to be separated suspended in said air flow, and a pair of similar separating assemblies positioned in superposed relation within the casing so as to provide an unagitated centrifugal sorting space between the assemblies, each separating assembly comprising an outer stationary annular conical deflector carried by the casing wall and projecting inwardly and upwardly, and an inner rotary whizzer comprising a central disk portion and a plurality of substantially radially projecting vanes the outer ends of which are beveled upwardly and inwardly and extend into proximity to the conical wall of the stationary deflector, there being an annular partition extending inwardly from the upper end of the casing so as to provide an annular centrifugal sorting space above the upper separating assembly.

5. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing and an upper fan for causing an air circulation upwardly through the inner casing and then downwardly through the outer casing and annular passage, means for feeding material to be separated onto the distributing disk, and a pair of similar separating assemblies positioned in superposed relation between the distributor and fan so as to provide an unagitated centrifugal sorting space therebetween, each separating assembly comprising cooperating rotary and stationary deflectors, the rotary deflector being carried by the rotating assembly and the stationary deflector being carried by the inner casing.

6. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing and an upper fan for causing an air circulation upwardly through the inner casing and then downwardly through the outer casing and annular passage, means for feeding material to be separated onto the distributing disk, and a pair of similar separating assemblies positioned in superposed relation between the distributor and fan so as to provide an unagitated centrifugal sorting space therebetween, each separating assembly comprising cooperating rotary and stationary deflectors, the rotary deflector being carried by the rotating assembly and the stationary deflector being carried by the inner casing, each rotating deflector having a central closed disk-like portion and being formed with an annular series of openings outwardly of this disk portion and adjacent the stationary deflector.

7. A separating comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing and an upper fan for causing an air circulation upwardly through the inner casing and then downwardly through the outer casing and annular passage, means for feeding material to be separated onto the distributing disk, and a pair of similar separating assemblies positioned in superposed relation between the distributor and fan so as to provide an unagitated centrifugal sorting space therebetween, each separating assembly comprising cooperating rotary and stationary deflectors, the rotary deflector being carried by the rotating assembly and the stationary deflector being carried by the inner casing, there being an annular partition projecting inwardly from the upper end of the inner casing to form a centrifugal sorting space above the upper separating assembly.

8. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing and an upper fan for causing an air circulation upwardly through the inner casing and then downwardly through the outer casing and annular passage, means for feeding material to be separated onto the distributing disc, and a pair of similar separating assemblies positioned in superposed relation between the distributor and fan so as to provide an unagitated centrifugal sorting space therebetween, each separating assembly comprising cooperating rotary and stationary deflectors, the rotary deflector being carried by the rotating assembly and the stationary deflector being carried by the inner casing, each rotating deflector having a central closed disk-like portion and being formed with an annular series of openings outwardly of this disk portion and adjacent the stationary deflector, there being an annular partition projecting inwardly from the upper end of the inner casing to form a centrifugal sorting space above the upper separating assembly.

9. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing, an upper fan for causing an air circulation upwardly through the inner casing and then downwardly through the outer casing and annular passage, and a pair of similar rotary whizzers each provided with an annular series of passages through the outer portion thereof and positioned in superposed relation within the inner casing and between the distributor and fan so as to provide an unagitated centrifugal sorting space therebetween, and a pair of inwardly and upwardly projecting annular conical stationary deflectors carried by the inner casing adjacent the wall thereof, one of these deflectors being associated with each whizzer and overlapping the outer portion thereof, and means for feeding material to be separated onto the distributing disk.

10. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing, an upper fan for causing an air circulation upwardly through the inner casing and then downwardly through the outer casing and annular passage, and a pair of similar rotary whizzers each provided with an annular series of passages through the outer portion thereof and positioned in superposed relation within the inner casing and between the distributor and fan so as to provide an unagitated centrifugal sorting space therebetween, and a pair of inwardly and upwardly projecting annular conical stationary deflectors carried by the inner casing adjacent the wall thereof, one of these deflectors being associated with each whizzer and overlapping the outer portion thereof, and means for feeding material to be separated onto the distributing disk, there being an annular partition projecting inwardly from the upper end of the inner casing between the upper whizzer and the fan.

11. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing, an upper fan for causing an air circulation upwardly through the inner casing and then downwardly through the outer casing and annular passage, and a pair of similar rotary whizzers each provided with an annular series of passages through the outer portion thereof and positioned in superposed relation within the inner casing and between the distributor and fan so as to provide an unagitated centrifugal sorting space therebetween, and a pair of inwardly and upwardly projecting annular conical stationary deflectors carried by the inner casing adjacent the wall thereof, one of these deflectors being associated with each whizzer and overlapping the outer portion thereof, and means for feeding material to be separated onto the distributing disk, each whizzer comprising a central disk portion and a plurality of substantially radially extending vanes projecting into proximity to the cooperating stationary deflector.

12. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing, an upper fan for causing an air circulation upwardly through the inner casing and then downwardly through the outer casing and annular passage, and a pair of similar rotary whizzers each provided with an annular series of passages through the outer portion thereof and positioned in superposed relation within the inner casing and between the distributor and fan so as to provide an unagitated centrifugal sorting space therebetween, and a pair of inwardly and upwardly projecting annular conical stationary deflectors carried by the inner casing adjacent the wall thereof, one of these deflectors being associated with each whizzer and overlapping the outer portion thereof, and means for feeding material to be separated onto the distributing disk, there being an annular partition projecting inwardly from the upper end of the inner casing between the upper whizzer and the fan, each whizzer comprising a central disk portion and a plurality of substantially radially extending vanes projecting into proximity to the cooperating stationary deflector.

13. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing, an upper fan for causing an air circulation upwardly through the inner casing and then downwardly through the outer casing and annular passage, and a pair of similar rotary whizzers each provided with an annular series of passages through the outer portion thereof and positioned in superposed relation within the inner casing and between the distributor and fan so as to provide an unagitated centrifugal sorting space therebetween, and a pair of inwardly and upwardly projecting annular conical stationary deflectors carried by the inner casing adjacent the wall thereof, one of these deflectors being associated with each whizzer and overlapping the outer portion thereof, and means for feeding material to be separated onto the distributing disk, there being an annular partition projecting inwardly from the upper end of the inner casing between the upper whizzer and the fan, each whizzer comprising a central disk portion and a plurality of substantially radially extending vanes the outer ends of which are beveled upwardly and inwardly and extend into close proximity to the adjacent conical surface of the cooperating stationary deflector.

14. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing, an upper fan for causing an air circulation upwardly through the inner casing and then downwardly through the outer casing and annular passage, and a pair of similar rotary whizzers each provided with an annular series of passages through the outer portion thereof and positioned in superposed relation within the inner casing and between the distributor and fan so as to provide an unagitated centrifugal sorting space therebetween, and a pair of inwardly and upwardly projecting annular conical stationary deflectors carried by the inner casing adjacent the wall thereof, one of these deflectors being associated with each whizzer and overlapping the outer portion thereof, and means for feeding material to be separated onto the distributing disk, there being an annular partition projecting inwardly from the upper end of the inner casing between the upper whizzer and the fan, each whizzer comprising a central disk portion and a plurality of substantially radially extending vanes projecting into proximity to the cooperating stationary deflector, there being an inwardly extending annular flange at the upper end of each stationary conical deflector which overlies the upper surfaces of the outer portions of the vanes.

15. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing, an upper fan for causing an air circulation upwardly through the inner casing and then downwardly through the outer casing and annular passage, and a pair of similar rotary whizzers each provided with an annular series of passages through the outer portion thereof and positioned in superposed relation within the inner casing and between the distributor and fan so as to provide an unagitated centrifugal sorting space therebetween, and a pair of inwardly and upwardly projecting annular conical stationary deflectors carried by the inner casing adjacent the wall thereof, one of these deflectors being associated with each whizzer and overlapping the outer portion thereof, and means for feeding material to be separated onto the distributing disk, there being an annular partition projecting inwardly from the upper end of the inner casing between the upper whizzer and the fan, each whizzer comprising a central disk portion and a plurality of substantially radially extending vanes the outer ends of which are beveled upwardly and inwardly and extend into close proximity to the adjacent conical surface of the cooperating stationary deflector, there being an inwardly extending annular flange at the upper end of each stationary conical deflector which overlies the upper surfaces of the outer portions of the vanes.

16. In a separator, a casing, means for causing an upward flow of air through the casing with material to be separated suspended in said air flow, and a pair of similar separating assemblies positioned in superposed relation within the casing so as to provide an unagitated centrifugal sorting space between the assemblies, each separating assembly comprising a rotary whizzer having a central disk portion and a plurality of substantially radially projecting vanes, the separating assembly also comprising annular deflecting means overlapping the outer end portions of the vanes to force the air and suspended material to pass between the vanes in a zone spaced from the casing wall.

17. In a separator, a casing, means for causing an upward flow of air through the casing with material to be separated suspended in said air flow, and a pair of similar separating assemblies positioned in superposed relation within the casing so as to provide an unagitated centrifugal sorting space between the assemblies, each separating assembly comprising a rotary whizzer having a central disk portion and a plurality of substantially radially projecting vanes, the separating assembly also comprising annular deflecting means overlapping the outer end portions of the vanes to force the air and suspended material to pass between the vanes in a zone spaced from the casing wall, there being an annular partition extending inwardly from the upper end of the casing so as to provide an annular centrifugal sorting space above the upper separating assembly.

18. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing and an upper fan for causing an air circulation upwardly through the inner casing and then downwardly through the outer casing and annular passage, means for feeding material to be separated onto the distributing disk, and a pair of similar separating assemblies positioned in superposed relation between the distributor and fan so as to provide an unagitated centrifugal sorting space therebetween, each separating assembly comprising a rotary whizzer having a central disk portion and a plurality of substantially radially projecting vanes, the separating assembly also comprising annular deflecting means overlapping the outer end portions of the vanes to force the air and suspended material to pass between the vanes in a zone spaced from the casing wall.

19. A separator comprising an outer casing having a conical lower collecting portion, an inner casing positioned substantially centrally within the outer casing so as to provide an annular passage between the casings, said inner casing also having a lower conical collecting portion, there being discharge outlets leading separately from the two casings, a rotary assembly positioned centrally within the casings and comprising a lower distributing disk within the inner casing and an upper fan for causing an air circulation upwardly through the inner casing and then downwardly through the outer casing and annular passage, means for feeding material to be separated onto the distributing disk, and a pair of similar separating assemblies positioned in superposed relation between the distributor and fan so as to provide an unagitated centrifugal sorting space therebetween, each separating assembly comprising a rotary whizzer having a central disk portion and a plurality of substantially radially projecting vanes, the separating assembly also comprising annular deflecting means overlapping the outer end portions of the vanes to force the air and suspended material to pass between the vanes in a zone spaced from the casing wall, there being an annular partition extending inwardly from the upper end of the casing so as to provide an annular centrifugal sorting zone above the upper separating assembly.

20. In a separator, a casing open only at its upper and lower ends, means for causing an upward flow of air through the casing with material to be separated suspended in the air-flow, and a pair of similar separating assemblies positioned in superposed relation within the casing and spaced apart to provide an unagitated centrifugal sorting space between the assemblies, each separating assembly comprising an outer stationary annular conical deflector carried by the casing wall and projecting inwardly and upwardly, and an inner rotary whizzer extending at its periphery into proximity to the conical wall of the stationary deflector, the casing being formed with an inwardly extending annular partition at its upper end surrounding the upper opening and providing an annular centrifugal sorting space above the upper separating assembly.

JOE CRITES.

CERTIFICATE OF CORRECTION.

Patent No. 2,169,680.                                              August 15, 1939.

JOE CRITES.

It is hereby certified that error appears in the printed specification of the above numbered patent requiring correction as follows: Page 1, first column, line 24, for the word "about" read abut; and that the said Letters Patent should be read with this correction therein that the same may conform to the record of the case in the Patent Office.

Signed and sealed this 3rd day of October, A. D. 1939.

(Seal)                                                         Henry Van Arsdale,
Acting Commissioner of Patents.